2,888,462

TRICHLOROMETHYLMERCAPTOPYRAZOLES

William N. Cannon, Greenwood, Ind., assignor to Eli Lilly and Company, Indianapolis, Ind., a corporation of Indiana No Drawing. Application November 7, 1957
Serial No. 694,922

6 Claims. (Cl. 260—310)

This invention relates to novel pyrazole compounds.

By this invention there are provided a group of compounds represented by the following formula:

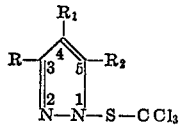

wherein R and $R_2$ are chosen from the group consisting of hydrogen, alkyl radicals having from 1 to 6 carbon atoms, and the phenyl radical, and $R_1$ is chosen from the group consisting of hydrogen, chlorine, bromine, and nitro.

As is apparent from the above formula, the novel compounds of this invention comprise a group of 1-trichloromethylmercaptopyrazoles, illustrative examples of which include 1-trichloromethylmercaptopyrazole, 1-trichloromethylmercapto-3-methyl-4-bromopyrazole, 1-trichloromethylmercapto-3-phenyl - 4 - nitropyrazole, 1-trichloromethylmercapto - 3 - n-hexylpyrazole, 1-trichloromethylmercapto-3,5-dibutyl-4-chloropyrazole, 1-trichloromethylmercapto-3-propyl-4-chloro-5-methylpyrazole, and the like.

The 1-trichloromethylmercaptopyrazoles of this invention can be prepared by reacting a suitably substituted pyrazole with trichloromethanesulfenyl chloride. The reaction can be carried out in the presence of a stoichiometric excess of the pyrazole base to neutralize the hydrogen chloride produced by the reaction, or alternatively by preparing a salt such as the sodium salt of the substituted pyrazole and reacting it with trichloromethanesulfenyl chloride.

The 1-trichloromethylmercaptopyrazoles of this invention are low melting solids or heavy viscous oils. They are quite soluble in most organic solvents, but have a rather limited solubility in water.

Many of the substituted pyrazoles employed as starting materials are known compounds prepared by generally known methods. Thus, for example, 3-amylpyrazole is obtained by the same general procedure which is employed for the preparation of 3-propylpyrazole as described by Von Auwers in Berichte 61B, 2410 (1928), except that amylmethyl ketone is used instead of propylmethyl ketone.

The pyrazole compounds can be isolated and purified by conventional procedures, as by distillation in vacuo in the case of the liquids, and by recrystallization from a suitable solvent or mixture of solvents in the case of solids. Since some of the compounds, especially those containing a halogen in the 4-position, are somewhat unstable when contaminated with reaction by-products, it is desirable that such compounds be substantially freed from those impurities, as by carefully controlled fractional distillation or repeated recrystallization from organic solvents, including solvents such as benzene, acetone, petroleum ether, and mixtures thereof. Nitromethane has been found to be especially suitable for recrystallization purposes.

The substituted pyrazole to be reacted with the trichloromethanesulfenyl chloride is capable of existing in tautomeric forms, since a hydrogen atom can be positioned on either of the two nitrogen atoms in the pyrazole nucleus. Accordingly, referring to the above general formula, when R and $R_2$ are different, as for example, when $R_1$ is hydrogen, R is methyl, and $R_2$ is hydrogen, the compound produced by reacting the methylpyrazole with trichloromethanesulfenyl chloride can be substituted by the methyl group in either the 3- or 5-position, and so can be either 1-trichloromethylmercapto-3-methylpyrazole or 1-trichloromethylmercapto-5-methylpyrazole. For the sake of convenience and simplicity, however, the unsymmetrically substituted compounds herein are represented both by formula and name as consisting of a single isomer, that being the 3-substituted isomer.

The methods of preparing the pyrazoles of this invention are more specifically illustrated by the following examples.

EXAMPLE 1

*Preparation of 1-trichloromethylmercapto-3-methylpyrazole*

41 g. of 3-methylpyrazole were dissolved in about 500 ml. of anhydrous diethyl ether, and the solution was cooled to about 0° C. 46.3 g. of trichloromethanesulfenyl chloride were added dropwise to the cooled, stirred solution. An immediate precipitate of 3-methylpyrazole hydrochloride formed. After the addition of the trichloromethanesulfenyl chloride had been completed, the reaction mixture was stirred for about one and one-half hours, and was filtered. The filter cake comprising 3-methylpyrazole hydrochloride was washed with two 100 ml. portions of ether. The combined ether filtrate and washings which contained 1-trichloromethylmercapto-3-methylpyrazole formed in the above reaction, were washed with three 100 ml. portions of water. The ether layer was separated, and was dried over solid anhydrous potassium carbonate. The drying agent was removed by filtration, and the ether was evaporated in vacuo. The residue comprising 1-trichloromethylmercapto-3-methylpyrazole was distilled. It boiled at about 62–63° C. at a pressure of about 0.1 mm. of mercury; $n_D^{25}=1.561$.

*Analysis.*—Calculated: N, 12.09; Cl, 45.54 . Found: N, 12.23; Cl, 45.37.

EXAMPLE 2

*Preparation of 1-trichloromethylmercapto-3,5-dimethyl-4-chloropyrazole*

A mixture of 32.6 g. of 3,5-dimethyl-4-chloropyrazole, 250 ml. of water and 12 g. of sodium hydroxide was heated to refluxing temperature, thus forming the water-soluble sodium salt of 3,5-dimethyl-4-chloropyrazole. The mixture was cooled to about 0° C., and 46.3 g. of trichloromethanesulfenyl chloride was added dropwise. After the addition had been completed, the reaction mixture was stirred for about two and one-half hours after which time about 500 ml. of diethyl ether were added. The ether dissolved the 1-trichloromethylmercapto-3,5-dimethyl-4-chloropyrazole which had formed in the above reaction. The ether layer was separated, was washed with three 100 ml. portions of water, and was dried. The ether was removed from the dried solution by evaporation in vacuo, and the residue comprising 1-trichloromethylmercapto-3,5-dimethyl-4-chloropyrazole was distilled at a temperature of 105–107° C. and a pressure of 0.75 mm. of mercury. The distillate solidified to give a straw colored solid which melted at about 61–62° C. after recrystallization from nitromethane. Analysis.—Calculated: N, 10.00; Cl, 50.65. Found: N, 10.06; Cl, 50.31.

EXAMPLE 3

*Preparation of 1-trichloromethylmercapto-4-nitropyrazole*

Following the procedure of Example 2, 28.3 g. of 4-nitropyrazole were reacted with 12 g. of sodium hydroxide in 250 ml. of water to form the sodium salt of 4-nitropyrazole. This compound was reacted with 46.5 g. of trichloromethanesulfenyl chloride to form 1-trichloromethylmercapto-4-nitropyrazole which melted at about 83–84° C. after recrystallization from n-hexane. Analysis.—Calculated: N, 16.01; Cl, 40.52. Found: N, 16.35; Cl, 40.29.

EXAMPLE 4

*Preparation of 1-trichloromethylmercapto-3-isobutylpyrazole*

Following the procedure of Example 2, 31 g. of isobutylpyrazole were reacted with 12 g. of sodium hydroxide in 250 ml. of water to form the sodium salt of 3-isobutylpyrazole. The compound was reacted with 46.3 g. of trichloromethanesulfenyl chloride to form 1-trichloromethylmercapto - 3 - isobutylpyrazole which boiled at about 97° C. at a pressure of about 0.4 mm. of mercury. $n_D^{25}=1.533$. Analysis.—Calculated: N, 10.25; Cl, 38.89. Found: N, 10.03; Cl, 38.65.

EXAMPLE 5

*Preparation of 1-trichloromethylmercapto-4-chloropyrazole*

Following the procedure of Example 1, 51.3 g. of 4-chloropyrazole in 500 ml. of ether were reacted with 46.3 g. of trichloromethanesulfenyl chloride. 1-trichloromethylmercapto-4-chloropyrazole thus prepared melted at about 37–38° C. It boiled at about 68–68.5° C. at a pressure of about 0.4 mm. of mercury. $n_D^{25}=1.561$. Analysis.—Calculated: N, 11.12; Cl, 56.29. Found: N, 11.22; Cl, 55.83.

EXAMPLE 6

*Preparation of 1-trichloromethylmercaptopyrazole*

6.8 g. of pyrazole and 7.9 g. of pyridine were added to 100 ml. of ether. The mixture was cooled to about 0° C. and maintained at that temperature while 18.6 g. of trichloromethanesulfenyl chloride were added thereto. The addition took about 1.5 hours during which time the reaction mixture was vigorously stirred. An immediate precipitate of pyridine hydrochloride formed. After the addition of the trichloromethanesulfenyl chloride had been completed, the pyridine hydrochloride was filtered from the reaction mixture, and the filter cake was washed with ether. The combined filtrate and washings which contained 1-trichloromethylmercaptopyrazole formed in the above reaction were washed with water, were dried, and the ether was removed therefrom by evaporation in vacuo. Distillation of the residue yielded 1-trichloromethylmercaptopyrazole boiling at about 106–107° C. at a pressure of about 10 mm. of mercury. Analysis.—Calculated: N, 12.88; Cl, 48.90. Found: N, 12.89; Cl, 48.18.

Other compounds coming within the scope of this invention can be prepared according to the procedure of Examples 1, 2 or 6. Illustrative compounds include the following: 1 - trichloromethylmercapto - 3,5 - dimethyl - pyrazole; M.P.=59–60° C. Analysis.—Calculated: N, 11.41; Cl, 45.32. Found: N, 11.30; Cl, 45.15; 1 - trichloromethylmercapto - 3 - methyl - 4 - chloropyrazole; M.P.=65.66° C. Analysis.—Calculated: N, 10.53; Cl, 53.52. Found: N, 10.88; Cl, 52.83; 1-trichloromethylmercapto - 3 - phenylpyrazole; M.P.=98–99° C. Analysis.—Calculated: N, 9.54; Cl, 36.22. Found: N, 9.58; Cl, 35.99; 1-trichloromethylmercapto-4-bromopyrazole; M.P.=40–42° C. Analysis.—Calculated: N, 9.45; S, 10.82. Found: N, 9.57; S, 10.54.

As is illustrated hereinafter, the compounds of this invention can be effectively employed as fungicides, bactericides, miticides and insecticides.

The insecticidal activities of the compounds are exemplified by their ability to kill houseflies as illustrated by the data given in Table I. The data were obtained in the following manner.

50 ml. of 5 percent aqueous sugar solution containing the compound under test in the desired concentration, was placed on a "Kim Pak," a cellu-cotton pad manufactured by the Kimberly-Clark Paper Co. of Neenah, Wisc. The treated pad was placed in an open petri dish and the dish was placed in a double screened cage two inches high and five inches in diameter, which contained fifty viable, adult houseflies. The cage was maintained in the open for 24 hours, and the percentage of dead flies was then determined. In this test method, the flies can be poisoned both by ingestion of the toxic compound and by direct contact, as by treading on the treated pad. The data in Table I summarize the results obtained by testing pyrazole compounds coming within the scope of this invention in the above manner. In the table the first column gives the name of the compound, the second column gives the concentration of the pyrazole compound in the 5 percent aqueous sugar solution, and the third gives the percent kill of houseflies at 24 hours.

TABLE I.—INSECTICIDAL ACTIVITY

| Compound Name | Concentration of Insecticidal Substance | Percent Kill at 24 Hours |
| --- | --- | --- |
| 1-trichloromethylmercaptopyrazole | 0.1 | 100 |
|  | 0.05 | 100 |
|  | 0.01 | 30 |
| 1-trichloromethylmercapto-4-chloropyrazole | 0.05 | 100 |
| 1-trichloromethylmercapto-3-methyl-pyrazole | 0.05 | 100 |
| 1-trichloromethylmercapto-4-bromo-pyrazole | 0.05 | 100 |
| 1-trichloromethylmercapto-3,5-di-methyl-4-chloropyrazole | 0.05 | 100 |
|  | 0.05 | 100 |
| 1-trichloromethylmercapto-4-iso-butylpyrazole | 0.01 | 44 |

The effectiveness of the compounds of this invention as miticides, is illustrated by the data presented in Table II. The data set forth in the table were obtained in the following manner:

Young, healthy lima bean plants were infested with about fifty *Tetranychus atlanticus* mites (a species of red spider mite). Several hours after the infestation, aqueous sprays containing varied amounts of the compounds under test were applied to both the dorsal and ventral leaf surfaces of the plants to the point of run-off. Five days later the treated plants were carefully inspected, the number of dead adult mites were noted, and the percentages of killed mites were determined. In Table II are given the experimental results obtained. In the table, the names of the compound under test are given in the first column, the concentrations in the test sprays of the compounds under investigation are given in the second column, and the percentages of mites killed after five days, are given in the third column.

TABLE II.—MITICIDAL ACTIVITY

| Compound | Concentration of Insecticidal Substances | Percent Killed at 5 Days |
|---|---|---|
| 1-trichloromethylmercaptopyrazole | 0.35 / 0.1 / 0.05 | 100 / 100 / 50 |
| 1-trichloromethylmercapto-3,5-dimethylpyrazole | 0.1 / 0.05 | 82 / 79 |
| 1-trichloromethylmercapto-4-chloropyrazole | 0.1 / 0.05 / 0.01 | 90 / 88 / 19 |
| 1-trichloromethylmercapto-3-methyl-4-chloropyrazole | 0.1 / 0.05 / 0.01 | 70 / 57 / 18 |
| 1-trichloromethylmercapto-3-phenylpyrazole | 0.1 | 11 |
| 1-trichloromethylmercapto-3-methylpyrazole | 0.1 / 0.05 / 0.01 | 48 / 16 / 15 |
| 1-trichloromethylmercapto-4-bromopyrazole | 0.1 / 0.05 / 0.01 | 93 / 77 / 21 |
| 1-trichloromethylmercapto-3,5-dimethyl-4-chloropyrazole | 0.1 / 0.05 / 0.01 | 100 / 87 / 51 |
| 1-trichloromethylmercapto-4-isobutylpyrazole | 0.1 / 0.05 / 0.01 | 100 / 87 / 80 |
| 1-trichloromethylmercapto-4-nitropyrazole | 0.35 / 0.1 / 0.05 / 0.01 | 100 / 100 / 87 / 12 |

The ability of the compounds provided by this invention to destroy plant pathogens of both bacterial and fungal nature is shown in Table III.

The activity of the compounds against plant pathogens was determined in vitro using the standard agar dilution method. In the table, the pathogenic organism is listed in the first column. The remaining columns set forth the code letter of the compound tested, and beneath each letter the minimum concentration of the compound in micrograms per milliter causing inhibition of organism growth over a 72 hour test period.

The compound associated with each code letter is as follows:

A. 1-trichloromethylmercaptopyrazole
B. 1-trichloromethylmercapto-3,5-dimethylpyrazole
C. 1-trichloromethylmercapto-4-chloropyrazole
D. 1-trichloromethylmercapto-3-methyl-4-chloropyrazole
E. 1-trichloromethylmercapto-3-phenylprazole
F. 1-trichloromethylmercapto-3-methylpyrazole
G. 1-trichloromethylmercapto4-bromopyrazole
H. 1-trichloromethylmercapto-3,5-dimethyl-4-chloropyrazole
I. 1-trichloromethylmercapto-4-isobutylpyrazole
J. 1-trichloromethylmercapto-4-nitropyrazole 1-trichloromethylmercapto-4-chloropyrazole has been found to possess a rather unique systemic effect when applied to tomato plants infected with fusarium wilt.

The compounds of this invention also show in vitro bactericidal and fungicidal activity against types of pathogenic organisms which affect human beings. In Table IV which follows are set forth the minimum inhibitory concentrations as determined by the standard agar dilution technique, at which the compounds tested were capable of preventing the growth of various Gram-positive bacteria and pathogenic fungi. It will be understood that not every specific organism listed in the table attacks human

TABLE III.—PLANT PATHOGEN ACTIVITY

| Pathogen: | A | B | C | D | E | F | G | H | I | J |
|---|---|---|---|---|---|---|---|---|---|---|
| Erwinia amylovora | 50 | 200 | 10 | 50 | 200 | 50 | 5 | 100 | 100 | >200 |
| Agrobacterium tumefaciens | 50 | >200 | 10 | 50 | 200 | 100 | 5 | 100 | 200 | >200 |
| Xanthomonas campestris | 50 | >200 | 10 | 50 | 200 | 100 | 10 | 100 | | 200 |
| Xanthomonas malvacearum | 50 | >200 | 5 | 50 | 200 | 50 | 5 | 100 | | 200 |
| Xanthomonas phaseoli | 50 | 200 | 10 | 50 | 200 | 50 | 5 | 50 | 100 | 100 |
| Pseudomonas solancearum | 50 | >200 | 10 | 50 | 200 | | 5 | 50 | | 200 |
| Pseudomonas Syringae | 50 | >200 | 50 | 50 | >200 | 200 | 10 | >200 | 200 | >200 |
| Corynebacterium isidiosum | 50 | >200 | 10 | 50 | 200 | 200 | 5 | 100 | 200 | 50 |
| Corynebacterium sepodonicum | 50 | 50 | 10 | 50 | 5 | 5 | 10 | 50 | 100 | |
| Fungal Plant Pathogens: | | | | | | | | | | |
| Monilina Fructiocola | <1 | 200 | 10 | 5 | 5 | 50 | 5 | 5 | 50 | >200 |
| Ustilago avanae | <1 | 10 | | | | 5 | <1 | 5 | 50 | 200 |
| Alternaria solani | <1 | 200 | | | | 10 | | 5 | 50 | 50 |
| Ceratostomella fimbriata | 5 | 100 | | | 5 | 50 | <1 | 5 | 100 | 100 |
| Fusarium moniliforme | 5 | 200 | 5 | 5 | 50 | 50 | 5 | 50 | 100 | 200 |
| Fusarium oxysporum | 50 | 200 | 5 | 5 | 50 | 50 | 5 | 10 | 100 | >200 |
| Colletotrichum gossypii | 5 | 50 | 10 | 10 | 10 | 10 | <1 | <1 | 50 | 200 |
| Ascochyta imperfecta | <1 | 100 | <1 | <1 | 5 | 5 | <1 | 5 | 50 | 200 |
| Sclerotinia bataicola | 5 | 200 | <1 | 5 | <1 | | | | 5 | 10 |
| Verticillum albo-atrum | 10 | 200 | 5 | 5 | 5 | 50 | <1 | 10 | 50 | 200 |

TABLE IV.—ANTIBACTERIAL ACTIVITY

| Test Organism | A | B | C | D | E | F | G | H | I | J |
|---|---|---|---|---|---|---|---|---|---|---|
| Staphylococcus aureus | 50 / 50 | 50 / 100 | 50 / 100 | 50 / 100 | 50 / 100 | 50 / 50 | 50 / 50 | 100 / 100 | 100 / 200 | 50 / 100 |
| Staphylococcus albus | 50 / 50 | 100 / 200 | 50 / 50 | 50 / 100 | 100 / 100 | 50 / 50 | 50 / 50 | 100 / 100 | 50 / 200 | 100 / 100 |
| Bacillus subtilis | 10 / 50 | 50 / 50 | 50 / 50 | 50 / 100 | 100 / 100 | 50 / 50 | 10 / 50 | 50 / 100 | 50 / 50 | 50 / 50 |
| Mycobacterium pheli | ---- / 5 | 100 / 100 | 10 / 10 | 5 / 5 | 5 / 5 | 5 / 10 / 5 | <1 / 5 | 50 / 10 | 50 / 50 | 50 / 50 |
| Mycobacterium tuberculosis (607) | ---- / 5 | 50 / 50 | 5 / 5 | ---- / 5 | ---- / <1 | 5 / 10 | <1 / <1 | 5 / 5 | 50 / 50 | 50 / 50 |
| Mycobacterium avium | ---- / 5 | 200 / 200 | 5 / 5 | 5 / 5 | 5 / 10 | 10 / 100 / 200 | <1 / 5 | 50 / 50 | 50 / 50 | 50 / 100 |
| Saccharomyces pastorianus | >1 / 5 | 50 / 50 | 5 / 5 | <1 / 5 | <1 / <1 | 10 / 50 | <1 / <1 | 5 / 10 | 50 / 50 | >200 |
| Candida albicans | 5 / 10 | 200 / 200 | 5 / 5 | 5 / 5 | 10 / 50 | 50 / 50 | <1 / <1 | 50 / 50 | 100 / 100 | >200 / ---- |
| Trichophyton rubrum | 50 | 100 | 5 / 5 | 5 / 5 | 5 / <1 | 10 / 100 | 5 / <1 | 50 / 50 | 50 / 100 | 50 / 200 |
| Trichophyton interdigitale | 100 | 10 | 5 / 5 | 5 / 5 | 5 / 5 | 5 / 100 | <1 / <1 | 5 / 5 | 50 / 50 | 50 / 50 |
| Brucella bronchiseptica | 50 / 50 | 200 / 200 | 5 / 50 | 10 / 100 | 50 / 200 | 200 / 200 | 5 / 50 | 100 / 200 | 100 / 200 | >200 / ---- |
| Vibrio metschnikovii | 50 / 50 | >200 / ---- | 5 / 50 | 10 / 50 | 100 / 100 | 100 / 100 | 5 / 10 | 50 / 100 | 200 / 200 | >200 / ---- | beings, but those organisms listed which do not attack man are closely related species-wise to organisms having pathogenicity for man. As was the case in Table III, the organism is identified in the left hand column, and the other columns set forth the code letter of the compound tested and the minimum inhibitory concentrations in parts per million, the upper figure being the minimum inhibitory concentration at the end of 24 hours and the lower figure at the end of 48 hours. The code letters which identify the compounds have the same significance as those employed in Table III.

The novel pyrazole compounds provided by this invention have a low toxicity for mammals, especially when their extremely high activity against plant pathogens and insects is considered. Toxicity tests in mice indicate that the compounds in general have an acute oral toxicity upwards of about 250 mg./kg.

For use, the compounds of this invention can be applied in the same manner as are other compounds with a utility of similar nature. Thus, for miticidal and fungicidal purposes the compounds conveniently are applied to the infested plant in the form of a dusting powder or spray. Spray formulations can be either solutions or suspensions. In Table V are given illustrative spray formulations, the quantities given being employed for 0.35 g. of compound, and a total liquid volume of 100 ml.

TABLE V.—AQUEOUS SPRAY FORMULATIONS

| Compound | Additive |
|---|---|
| 1 - trichloromethylmercaptopyrazole | 5 ml. ethanol. 5 ml. surface-active agent. |
| 1 - trichloromethylmercapto - 3,5 - dimethylpyrazole. | Talc. |
| 1 - trichloromethylmercapto - 4 - chloropyrazole. | 5 ml. benzene. 5 ml. surface-active agent. |
| 1 - trichloromethylmercapto - 3 - methyl-4-chloropyrazole. | Talc. |
| 1 - trichloromethylmercapto-3-phenylpyrazole. | Talc. |
| 1 - trichloromethylmercapto-3-methylpyrazole. | 5 ml. benzene. 5 ml. surface-active agent. |
| 1 - trichloromethylmercapto - 4-bromopyrazole. | 5 ml. benzene. 5 ml. surface-active agent. |
| 1 - trichloromethylmercapto - 3,5 - dimethyl-4-chloropyrazole. | 5 ml. benzene. 5 ml. surface-active agent. |
| 1 - trichloromethylmercapto - 4 - isobutylpyrazole. | 5 ml. benzene. 5 ml. surface-active agent. |
| 1 - trichloromethylmercapto - 4 - nitropyrazole. | Talc. |

To prepare the spray, an organic solvent, such as benzene, or ethanol, is used to dissolve the pyrazole compound, a surface-active agent is added, and water is added to the desired final volume. The surface-active agent preferably is a non-ionic detergent such as an alkyl aryl polyether alcohol. A suitable agent is Triton X–100, an alkyl aryl polyether alcohol manufactured by Rohm and Haas Company of Philadelphia, Pennsylvania. Also, in column 2 of the table, where it is indicated that talc is employed, the following formulation procedure was used: 0.35 g. of sample plus talc are ground with a mortar and pestle to a slurry. A small amount of surface-active agent is added and the slurry is then diluted with water to the desired final volume.

Other formulations such as wettable powders, dusting powders, and the like are readily prepared by the customary methods well known to the art, and such formulations can be employed for mite and fungus control in accordance with standard practice.

I claim:

1. A compound represented by the formula

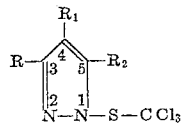

wherein R and $R_2$ are chosen from the group consisting of hydrogen, phenyl, and alkyl radicals having from 1 to 6 carbon atoms, and $R_1$ is chosen from the group consisting of hydrogen, chlorine, bromine, and nitro.

2. 1-trichloromethylmercapto-4-chloropyrazole.

3. 1 - trichloromethylmercapto - 3,5 - dimethyl - 4-chloropyrazole.

4. 1-trichloromethylmercapto-3-isobutylpyrazole.

5. 1-trichloromethylmercaptopyrazole.

6. 1-trichloromethylmercapto-4-nitropyrazole.

References Cited in the file of this patent

UNITED STATES PATENTS 2,681,915    Gysin et al. _____ June 22, 1954

FOREIGN PATENTS 666,636    Great Britain _____ Feb. 13, 1952

OTHER REFERENCES

Kittleson: Science, vol. 115, pp. 84–6 (1952).

Frear et al.: J. of Economic Entomology, vol. 40, pp. 736–741 (1947).